US008836859B2

(12) United States Patent
Fujita

(10) Patent No.: US 8,836,859 B2
(45) Date of Patent: Sep. 16, 2014

(54) IMAGE PROCESSING APPARATUS, IMAGE PROCESSING METHOD AND IMAGE DISPLAY APPARATUS

(75) Inventor: Kazuhide Fujita, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 13/552,801

(22) Filed: Jul. 19, 2012

(65) Prior Publication Data

US 2013/0027610 A1    Jan. 31, 2013

(30) Foreign Application Priority Data

Jul. 27, 2011 (JP) ................. 2011-163881

(51) Int. Cl.
*H04N 7/01* (2006.01)
*H04N 11/20* (2006.01)

(52) U.S. Cl.
CPC .............. *H04N 7/012* (2013.01); *H04N 7/0147* (2013.01); *H04N 7/014* (2013.01)
USPC ........... 348/452; 348/441; 348/445; 348/451; 348/447; 348/448; 348/538; 345/419; 345/606; 345/475

(58) Field of Classification Search
USPC ......................... 345/419, 606, 475
See application file for complete search history.

(56) References Cited

U.S. PATENT DOCUMENTS 6,522,339 B1 * 2/2003 Orimo ............................ 345/606
7,268,820 B2 * 9/2007 Honda et al. .................. 348/441
8,411,200 B2 * 4/2013 Shao ............................. 348/441

FOREIGN PATENT DOCUMENTS

JP  2006-352303 A  12/2006
JP  4551343 B2  9/2010

* cited by examiner

*Primary Examiner* — Jefferey Harold
*Assistant Examiner* — Omer Khalid
(74) *Attorney, Agent, or Firm* — Lerner, David, Littenberg, Krumholz & Mentlik, LLP

(57) ABSTRACT

Disclosed herein is an image processing apparatus including an interlace/progressive conversion section configured to carry out interpolation processing on image data of the current field by making use of the image data of the current field and image data of a field leading ahead of the current field by one field period in order to obtain image data of a progressive system with no delay time.

8 Claims, 11 Drawing Sheets

○ INTERPOLATED-PIXEL POSITION (AT A NORMAL TIME, THE OUTPUT IS DELAYED BY 1V)
<--> INTER-FRAME DIFFERENCE (SUM OF ABSOLUTE VALUES OF DIFFERENCES BETWEEN PIXELS IN A BLOCK)
<--> INTER-FIELD DIFFERENCE (SUM OF ABSOLUTE VALUES OF DIFFERENCES BETWEEN PIXELS IN A BLOCK AT TWO UPPER AND LOWER POSITIONS)

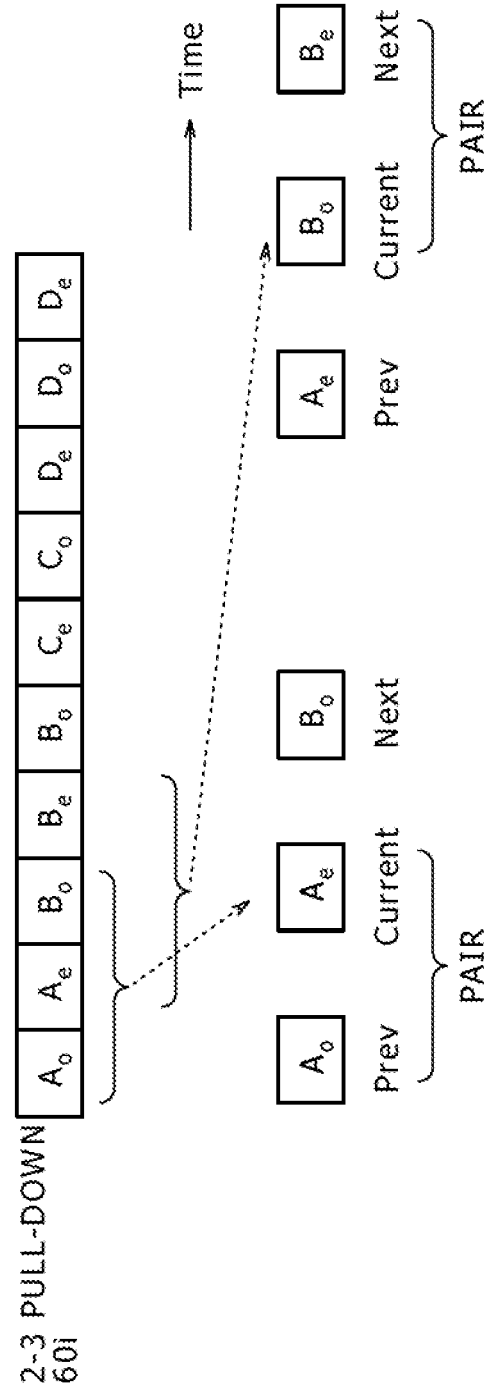

FIG. 6

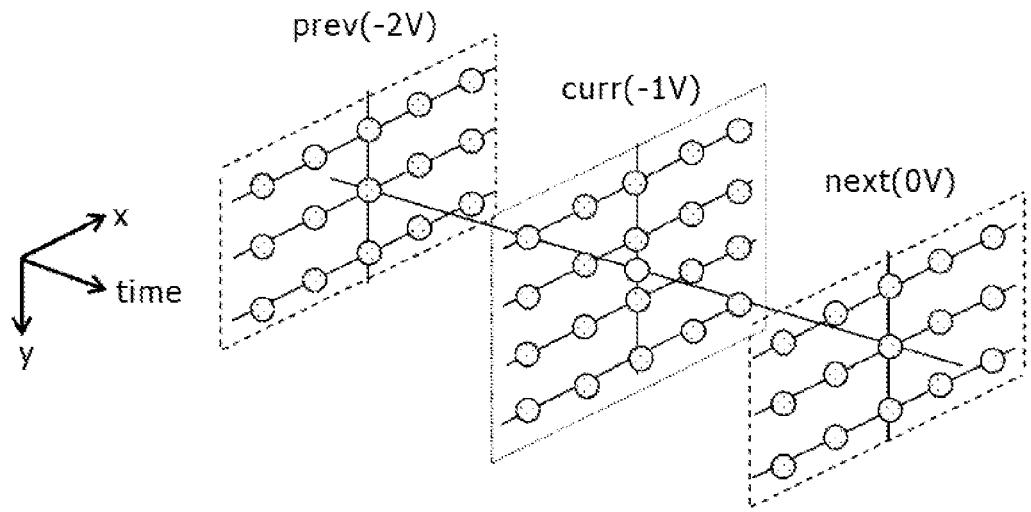

○ INTERPOLATED-PIXEL POSITION (IN AN IMAGE-QUALITY PRIORITY MODE, THE OUTPUT IS DELAYED BY 1V)
▢ INTERPOLATION PIXEL SELECTION CANDIDATES FOR INTRA-FIELD INTERPOLATION
▢ INTERPOLATION PIXEL SELECTION CANDIDATES FOR INTER-FIELD INTERPOLATION

FIG. 7

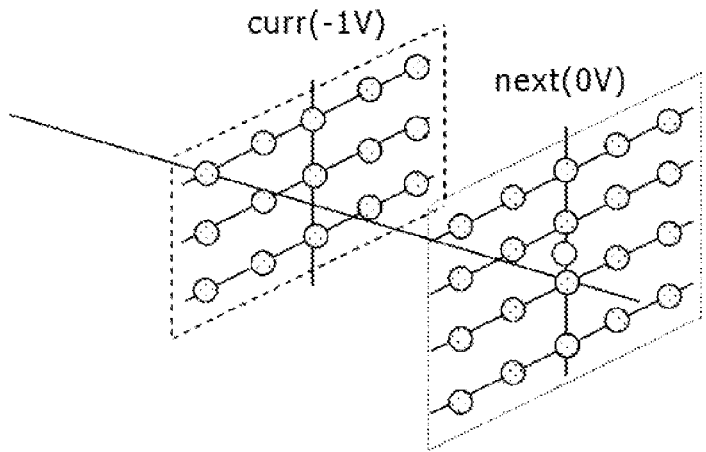

○ INTERPOLATED PIXEL POSITION (IN A SPEED PRIORITY MODE, THE OUTPUT IS DELAYED BY 0V)
▢ INTERPOLATION PIXEL SELECTION CANDIDATES FOR INTRA-FIELD INTERPOLATION
▢ INTERPOLATION PIXEL SELECTION CANDIDATES FOR INTER-FIELD INTERPOLATION

IMAGE PROCESSING APPARATUS, IMAGE PROCESSING METHOD AND IMAGE DISPLAY APPARATUS

CROSS-REFERENCE TO RELATED APPLICATION

The present application claims priority from Japanese Patent Application No. JP 2011-163881 filed in the Japanese Patent Office on Jul. 27, 2011, the entire content of which is incorporated herein by reference.

BACKGROUND

The present disclosure relates to an image processing apparatus, an image processing method and an image display apparatus. More particularly, the present disclosure relates to an image processing apparatus or the like configured to convert image data of an interlace system into image data of a progressive system.

Documents such as Japanese Patent Laid-open No. 2006-352303 disclose a related-art technology. In accordance with this technology, a processing time of IP (Interlace/Progressive) conversion processing carried out at a game mode time is shortened by skipping three-dimensional (time direction) IP conversion processing at the game mode time. In addition, documents such as Japanese Patent No. 4551343 disclose a technology in accordance with which, if the current mode is determined to be a game mode, the IP conversion processing is carried out as a so-called doubling processing for copying an original line to an interpolated line.

SUMMARY

In accordance with the technology described in Japanese Patent Laid-open No. 2006-352303, intra-field interpolation processing is carried out on a current field independently of the movement of the image in order to output image data of the progressive system. Thus, line flickers are generated on the image between fields so that the quality of the image deteriorates. In addition, in accordance with the technology described in Japanese Patent No. 4551343, the doubling processing is carried out in order to output image data of the progressive system. Thus, jaggies (or knurls) are generated on an inclined line so that the quality of the image deteriorates.

It is thus desirable to implement IP conversion processing which results in an image having a high quality and entails only a short delay time.

In accordance with an embodiment of the present disclosure, there is provided an image processing apparatus having an interlace/progressive conversion section configured to carry out interpolation processing on image data of the current field by making use of the image data of the current field and image data of a field leading ahead of the current field by one field period in order to obtain image data of a progressive system with no delay time.

In accordance with the embodiment of the present disclosure, the interlace/progressive conversion section carries out interpolation processing on the image data of the current field by making use of the image data of the current field and the image data of the field leading ahead of the current field by one field period in order to obtain image data of the progressive system having no delay time. In this case, since three-dimensional IP conversion processing is carried out, line flickers can be prevented from being generated between fields so that it is possible to implement IP conversion processing resulting in an image having a high quality.

It is to be noted that, in accordance with the embodiment of the present disclosure, the interlace/progressive conversion section may for example determine each pixel and its coefficient, which are to be used in interpolating the image of the current field, by adaptively switching processing from movement adaptive interpolation processing based on a movement detection result to movement compensation interpolation processing based on a motion-vector detection result and vice versa. In addition, in this case, the interlace/progressive conversion section may detect a direction of an inclined line in the movement adaptive interpolation processing by making use of data of pixels surrounding an interpolated pixel and may determine pixels according to the direction of the inclined line as well as a coefficient for each of the pixels. By carrying out inclined-line adaptive interpolation processing in this way, jaggies can be prevented from being generated on the inclined line so that the quality of the image can be further improved.

In addition, in accordance with the embodiment of the present disclosure, the interlace/progressive conversion section may for example include: a pixel/coefficient select part configured to determine each pixel and its coefficient, which are to be used in interpolating the image of the current field, by adaptively switching processing from the movement adaptive interpolation processing based on a movement detection result to the movement compensation interpolation processing based on a motion-vector detection result and vice versa; and an interpolation part configured to obtain image data of the progressive system by carrying out interpolation processing on the image data of the current field by making use of the image data of the current field and the image data of the field leading ahead of the current field by one field period on the basis of each pixel and its coefficient that have been determined by the pixel/coefficient select part.

In this case, the pixel/coefficient select part determines each pixel and its coefficient, which are to be used in interpolating the image of the current field, by adaptively switching processing from the movement adaptive interpolation processing based on a movement detection signal to the movement compensation interpolation processing based on a motion-vector detection signal and vice versa. Then, the interpolation part obtains image data of the progressive system by carrying out interpolation processing on the image data of the current field by making use of the image data of the current field and the image data of the field leading ahead of the current field by one field period on the basis of each pixel and its coefficient that have been determined by the pixel/coefficient select part.

Since image data of the progressive system is obtained by carrying out interpolation processing on the image data of the current field as described above, the image data of the progressive system entailing only a short delay time can be obtained. In addition, each pixel and its coefficient, which are to be used in interpolating the image of the current field, are determined by adaptively switching processing from the movement adaptive interpolation processing based on a movement detection signal to the movement compensation interpolation processing based on a motion-vector detection signal and vice versa. That is to say, three-dimensional IP conversion processing is carried out. Thus, line flickers can be prevented from being generated between fields so that it is possible to implement IP conversion processing resulting in an image having a high quality.

In addition, in accordance with another embodiment of the present disclosure, there is provided an image processing method obtaining image data of a progressive system by carrying out interpolation processing on image data of the current field through use of the image data of the current field and image data of a field leading ahead of the current field by one field period and through adaptive switching of processing from movement adaptive interpolation processing based on a movement detection result to movement compensation interpolation processing based on a motion-vector detection result and vice versa.

In addition, in accordance with still another embodiment of the present disclosure, there is provided an image processing apparatus including: a pixel/coefficient select part configured to determine each pixel and its coefficient, which are to be used in interpolating image of a field leading ahead of the current field by one field period, by adaptively switching processing among movement adaptive interpolation processing based on a movement detection signal, movement compensation interpolation processing based on a motion-vector detection signal and inverted pull-down conversion processing based on a film detection signal in an image-quality priority mode, and to determine each pixel and its coefficient, which are to be used in interpolating image of the current field, by adaptively switching processing from the movement adaptive interpolation processing based on a movement detection signal to the movement compensation interpolation processing based on a motion-vector detection signal and vice versa in a speed priority mode; and an interpolation part configured to obtain image data of a progressive system in the image-quality priority mode by carrying out interpolation processing on the image data of the field leading ahead of the current field by one field period by making use of the image data of the current field, the image data of the field leading ahead of the current field by one field period and image data of a field leading ahead of the current field by two field periods on the basis of each pixel and its coefficient that have been determined by the pixel/coefficient select part, and to obtain image data of the progressive system in the speed priority mode by carrying out interpolation processing on the image data of the current field by making use of the image data of the current field and the image data of the field leading ahead of the current field by one field period on the basis of each pixel and its coefficient that have been determined by the pixel/coefficient select part.

The embodiment of the present disclosure provides the image-quality priority mode and the speed priority mode. In the image-quality priority mode, the pixel/coefficient select part determines each pixel and its coefficient, which are to be used in interpolating the image of the field leading ahead of the current field by one field period, by adaptively switching processing among the movement adaptive interpolation processing based on a movement detection signal, the movement compensation interpolation processing based on a motion-vector detection signal and the inverted pull-down conversion processing based on a film detection signal. Then, in the image-quality priority mode, the interpolation part obtains image data of the progressive system by carrying out interpolation processing on the image data of the field leading ahead of the current field by one field period by making use of the image data of the current field, the image data of the field leading ahead of the current field by one field period and the image data of the field leading ahead of the current field by two field periods on the basis of each pixel and its coefficient that have been determined by the pixel/coefficient select part.

In the speed priority mode, the pixel/coefficient select part determines each pixel and its coefficient, which are to be used in interpolating the image of the current field, by adaptively switching processing from the movement adaptive interpolation processing based on a movement detection signal to the movement compensation interpolation processing based on a motion-vector detection signal and vice versa. Then, in the speed priority mode, the interpolation part obtains image data of the progressive system by carrying out interpolation processing on the image data of the current field by making use of the image data of the current field and the image data of the field leading ahead of the current field by one field period on the basis of each pixel and its coefficient that have been determined by the pixel/coefficient select part.

As is obvious from the above descriptions, in accordance with the embodiment of the present disclosure, image processing can be carried out in the image-quality priority mode or the speed priority mode. In the image-quality priority mode, it is possible to carry out IP conversion processing resulting in an image with a high quality. In the speed priority mode, it is possible to carry out IP conversion processing resulting in an image with a high quality and entailing only a short delay time.

That is to say, in the image-quality priority mode, each pixel and its coefficient, which are to be used in interpolating the image of the field leading ahead of the current field by one field period, are determined by adaptively switching processing among the movement adaptive interpolation processing, the movement compensation interpolation processing and the inverted pull-down conversion processing. Thus, it is possible to carry out IP conversion processing resulting in an image with a high quality in the image-quality priority mode.

In the speed priority mode, on the other hand, image data of the progressive system is obtained by carrying out interpolation processing on the image data of the current field. In addition, each pixel and its coefficient, which are to be used in interpolating the image of the current field, are determined by adaptively switching processing from the movement adaptive interpolation processing to the movement compensation interpolation processing and vice versa. That is to say, three-dimensional IP conversion processing is carried out. Thus, in the speed priority mode, it is possible to carry out IP conversion processing resulting in an image with a high quality and entailing only a short delay time.

In addition, in accordance with yet another embodiment of the present disclosure, there is provided an image display apparatus including: an image processing section configured to convert image data of an interlace system into image data of a progressive system; an image display section configured to display an image on the basis of the image data of the progressive system generated by the image processing section; and a control section configured to control the image processing section selectively in an image-quality priority mode or a speed priority mode. The image processing section includes a pixel/coefficient select part configured to determine each pixel and its coefficient, which are to be used in interpolating image of a field leading ahead of the current field by one field period, by adaptively switching processing among movement adaptive interpolation processing based on a movement detection result, movement compensation interpolation processing based on a motion-vector detection result and inverted pull-down conversion processing based on a film detection result in the image-quality priority mode, and to determine each pixel and its coefficient, which are to be used in interpolating image of the current field, by adaptively switching processing from the movement adaptive interpolation processing based on a movement detection result to the movement compensation interpolation processing based on a motion-vector detection result and vice versa in the speed priority mode. The image processing section further includes an interpolation part configured to obtain image data of the progressive system in the image-quality priority mode by carrying out interpolation processing on the image data of the field leading ahead of the current field by one field period by making use of the image data of the current field, the image data of the field leading ahead of the current field by one field period and image data of a field leading ahead of the current field by two field periods on the basis of each pixel and its coefficient that have been determined by the pixel/coefficient select part, and to obtain image data of the progressive system in the speed priority mode by carrying out interpolation processing on the image data of the current field by making use of the image data of the current field and the image data of the field leading ahead of the current field by one field period on the basis of each pixel and its coefficient that have been determined by the pixel/coefficient select part.

In accordance with the embodiments of the present disclosure, it is possible to carry out IP conversion processing resulting in an image with a high quality and entailing only a short delay time.

BRIEF DESCRIPTION OF THE DRAWINGS

FIGS. 5A to 5C are explanatory diagrams to be referred to in description of film detection processing carried out by a film detection part employed in the IP conversion section;

FIG. 6 is a diagram showing typical interpolation pixel selection candidates of intra-field interpolation and inter-field interpolation for an interpolated pixel position on an image of a field leading ahead of the current field by one field period in an image-quality priority mode;

FIG. 7 is a diagram showing typical interpolation pixel selection candidates of intra-field interpolation and inter-field interpolation for an interpolated pixel position on an image of the current field in a speed priority mode;

DETAILED DESCRIPTION OF THE PREFERRED EMBODIMENT

The following description explains an embodiment which is an implementation realizing the present disclosure. It is to be noted that the following description is divided into explanations arranged as follows.

1. Embodiment
2. Modification examples

1. Embodiment

[Typical Configuration of TV Receiver]

Figure 1:
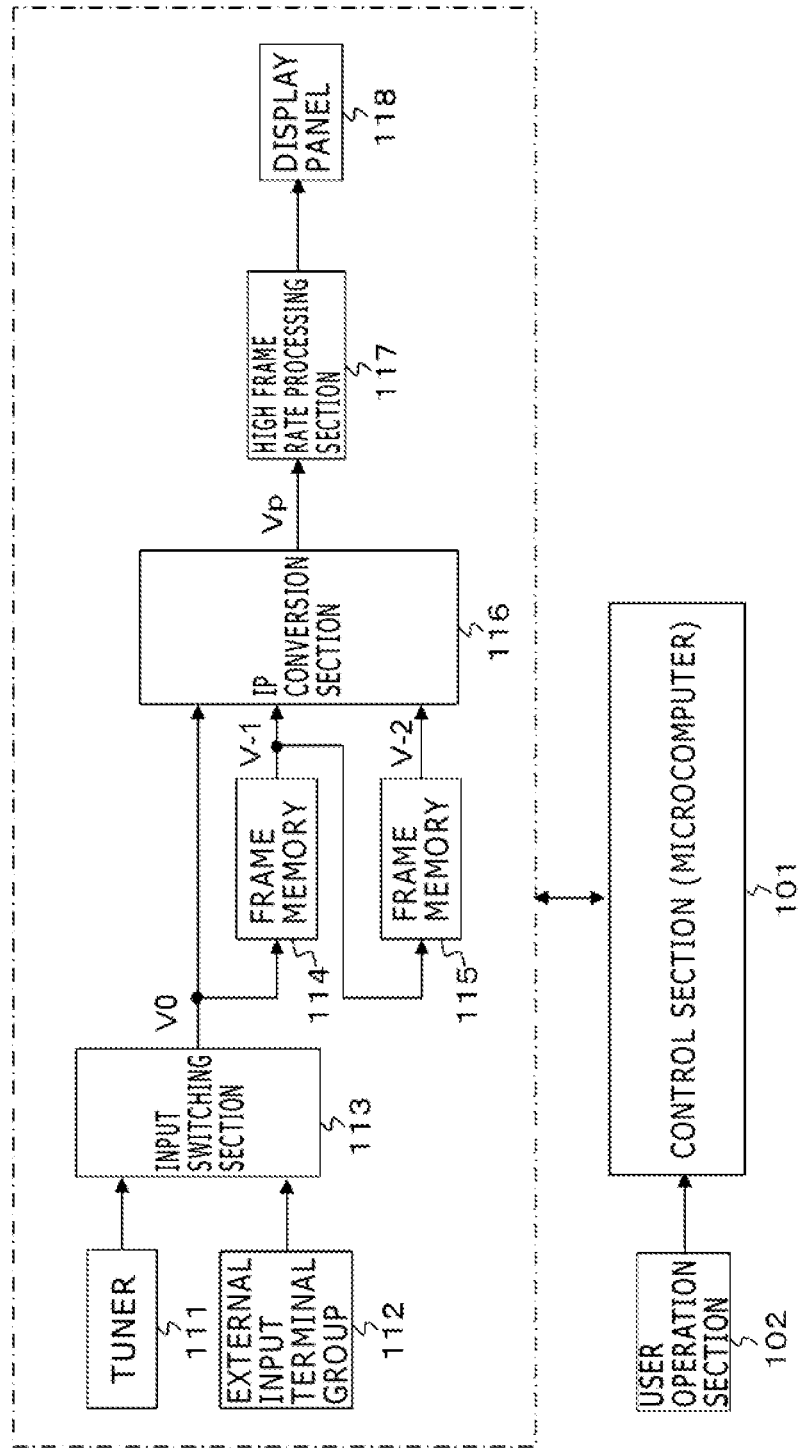
FIG. 1 is a block diagram showing a typical configuration of a TV receiver according to an embodiment of the present disclosure.

FIG. 1 is a block diagram showing a typical configuration of a TV receiver 10 according to an embodiment of the present disclosure. As shown in the figure, the TV receiver 10 is provided with a control section 101 and a user operation section 102. In addition, the TV receiver 10 also has a tuner 111, an external input terminal group 112, an input switching section 113, frame memories 114 and 115, an IP conversion section 116, a high frame rate processing section 117 and a display panel 118.

The control section 101 is configured as a microcomputer. The control section 101 controls operations carried out by the aforementioned sections employed in the TV receiver 10. The user operation section 102 serves as a user interface and connected to the control section 101. The user operation section 102 includes components provided on a case, not shown in the figure, of the TV receiver 10, a remote controller, and the like. Typical examples of the components are keys, buttons and a dial.

The tuner 111 receives broadcasts such as BS (Broadcasting Satellite) broadcasts and terrestrial digital broadcasts. To be more specific, the tuner 111 receives a broadcast signal captured by an antenna not shown in the figure. The tuner 111 acquires image data of a predetermined program, which is selected by the user operating the user operation section 102, from the received broadcast signal. The external input terminal group 112 is provided with a plurality of terminals each used for receiving image data (that is, time-axis sequential image data) from an external apparatus such as a game machine, a BD (Blu-ray Disc) recorder, a DVD (Digital Versatile Disc) player, a set-top box or a personal computer, to mention a few.

The input switching section 113 selectively takes out image data V0 to be displayed, from the image data acquired by the tuner 111 or the image data received by the external input terminal group 112 on the basis of an operation carried out by the user. In actuality, this image data V0 is image data of the progressive or interlace system. In order to make the following explanation simple, however, this image data V0 is assumed to be image data of the interlace system in the following explanation.

Each of the frame memories 114 and 115 functions as a delay line. To put it in detail, the frame memory 114 stores the image data V0 of the current field in order to delay the image data V0 by one field period, outputting image data V-1 of the field leading ahead of the current field by one field period. The frame memory 115 stores the image data V-1 of the field leading ahead of the current field by one field period in order to further delay the image data V-1 by one field period, outputting image data V-2 of the field leading ahead of the current field by two field periods (one frame period).

The IP conversion section 116 converts the image data of the interlace system into image data Vp of the progressive system on the basis of the image data V0 of the current field, the image data V-1 of the field leading ahead of the current field by one field period and the image data V-2 of the field leading ahead of the current field by two field periods. In accordance with control executed by the control section 101, the IP conversion section 116 carries out IP conversion processing in an image-quality priority mode (that is, a normal mode) or a speed priority mode (that is, a game mode).

In the image-quality priority mode, the IP conversion section 116 carries out three-dimensional IP conversion processing by adaptively switching the processing among movement adaptive interpolation processing based on a movement detection result, movement compensation interpolation processing based on a motion-vector detection result and inverted pull-down conversion processing based on a film detection result. In this case, the IP conversion section 116 carries out interpolation processing on the image data V-1 of the field leading ahead of the current field by one field period on the basis of the image data V0 of the current field, the image data V-1 of the field leading ahead of the current field by one field period and the image data V-2 of the field leading ahead of the current field by two field periods in order to obtain the image data Vp of the progressive system. The image data Vp of the progressive system is image data delayed by 1V.

In the speed priority mode, on the other hand, the IP conversion section 116 carries out three-dimensional IP conversion processing by adaptively switching the processing from movement adaptive interpolation processing based on a movement detection result to movement compensation interpolation processing based on a motion-vector detection result and vice versa. In this case, the IP conversion section 116 carries out interpolation processing on the image data V0 of the current field on the basis of the image data V0 of the current field and the image data V-1 of the field leading ahead of the current field by one field period in order to obtain the image data Vp of the progressive system. In this case, the image data Vp of the progressive system is generated without a delay time. The IP conversion section 116 will be described in detail later.

The high frame rate processing section 117 carries out, on the image data Vp of the progressive system generated by the IP conversion section 116, interpolation processing (high frame rate processing) in time direction for increasing the frame rate of the image data Vp in order to obtain image data Vp' of the progressive system. The display panel 118 displays an image based on the image data Vp' of the progressive system generated by the high frame rate processing section 117. The display panel 118 is a liquid-crystal display panel, for example, and can obtain improved quality of an image through the high frame rate processing described above.

Operations carried out by the TV receiver 10 shown in FIG. 1 are explained as follows. The tuner 111 acquires image data (that is, time-axis sequential image data) of a predetermined program which is selected by the user operating the user operation section 102. The tuner 111 supplies the image data thus acquired to the input switching section 113. In addition, the external input terminal group 112 receives image data (that is, time-axis sequential image data) from an external apparatus such as a game machine, a BD recorder, a DVD player, a set-top box or a personal computer. The external input terminal group 112 then supplies this image data to the input switching section 113.

The input switching section 113 takes out the image data V0 to be displayed from the image data acquired by the tuner 111 or the image data received by the external input terminal group 112 on the basis of an operation carried out by the user. The input switching section 113 provides the IP conversion section 116 with the image data V0 which is the image data of the current field.

The IP conversion section 116 converts the image data of the interlace system into the image data Vp of the progressive system on the basis of the image data V0 of the current field, the image data V-1 of the field leading ahead of the current field by one field period and the image data V-2 of the field leading ahead of the current field by two field periods. In accordance with control executed by the control section 101, the IP conversion section 116 carries out IP conversion processing in the image-quality priority mode or the speed priority mode.

In the image-quality priority mode, the IP conversion section 116 carries out three-dimensional IP conversion processing by adaptively switching the processing among movement adaptive interpolation processing based on a movement detection result, movement compensation interpolation processing based on a motion-vector detection result and inverted pull-down conversion processing based on a film detection result. In this case, the IP conversion section 116 carries out interpolation processing on the image data V-1 of the field leading ahead of the current field by one field period on the basis of the image data V0 of the current field, the image data V-1 of the field leading ahead of the current field by one field period and the image data V-2 of the field leading ahead of the current field by two field periods in order to obtain the image data Vp of the progressive system.

In the speed priority mode, on the other hand, the IP conversion section 116 carries out three-dimensional IP conversion processing by adaptively switching the processing from movement adaptive interpolation processing based on a movement detection result to movement compensation interpolation processing based on a motion-vector detection result and vice versa. In this case, the IP conversion section 116 carries out interpolation processing on the image data V0 of the current field on the basis of the image data V0 of the current field and the image data V-1 of the field leading ahead of the current field by one field period in order to obtain the image data Vp of the progressive system. In this case, the image data Vp of the progressive system is generated without a delay time.

The IP conversion section 116 supplies the image data Vp of the progressive system generated by the IP conversion section 116 to the high frame rate processing section 117. The high frame rate processing section 117 carries out, on the image data Vp, interpolation processing (high frame rate processing) in time direction for increasing the frame rate of the image data Vp in order to obtain the image data Vp' of the progressive system. The image data Vp' is supplied to the display panel 118. The display panel 118 displays an image based on the image data Vp'.

[Typical Configuration of IP Conversion Section]

Figure 2:
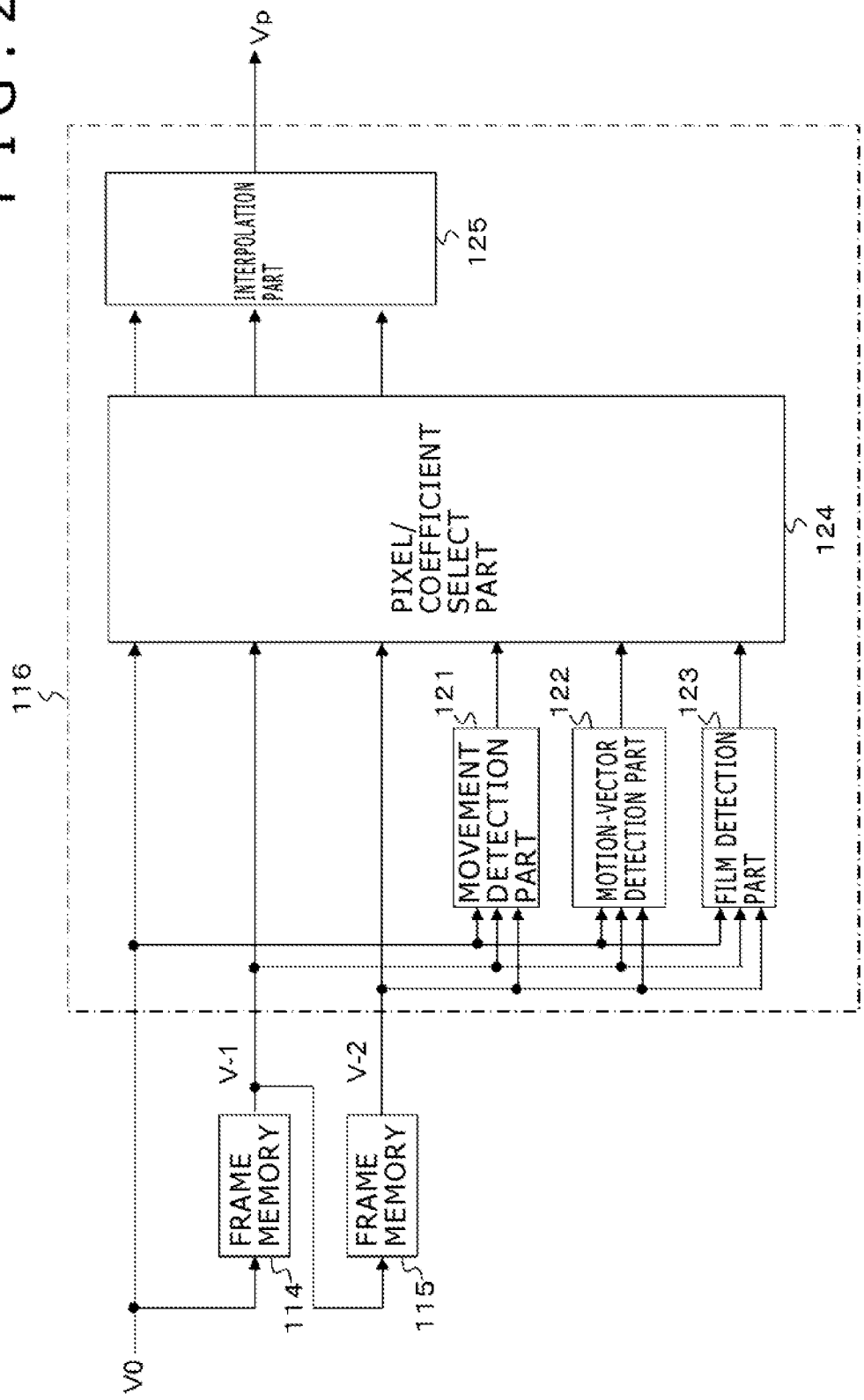
FIG. 2 is a block diagram showing a typical configuration of an IP conversion section employed in the TV receiver.

FIG. 2 is a block diagram showing a typical configuration of the IP conversion section 116 employed in the TV receiver 10. As shown in the figure, the IP conversion section 116 includes a movement detection part 121, a motion-vector detection part 122, a film detection part 123, a pixel/coefficient select part 124 and an interpolation part 125.

Figure 3:
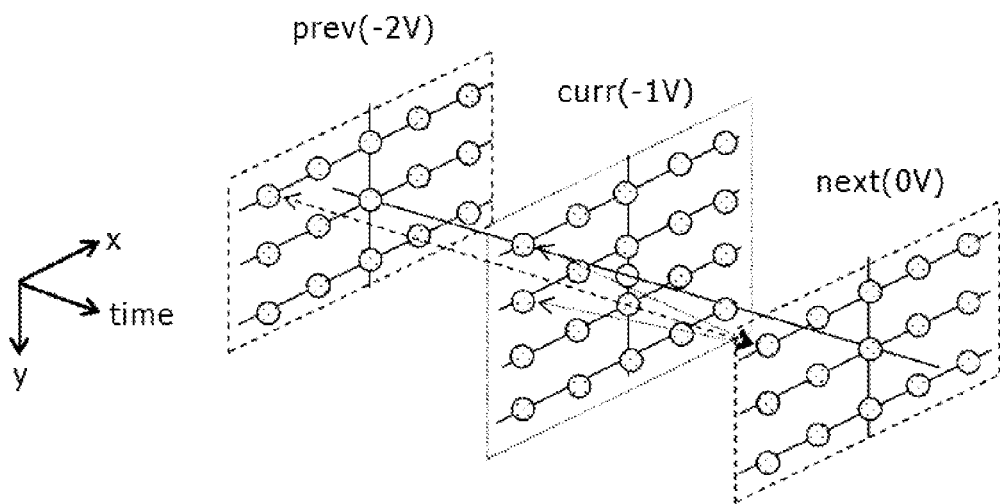
FIG. 3 is an explanatory diagram to be referred to in description of movement detection processing carried out by a movement detection part employed in the IP conversion section.

The movement detection part 121 carries out movement detection processing on the basis of the image data V0 of the current field, the image data V-1 of the field leading ahead of the current field by one field period and the image data V-2 of the field leading ahead of the current field by two field periods. As shown in FIG. 3, the movement detection part 121 determines whether a pixel is moving or at a standstill for every pixel typically by comparing a sum of the absolute values of differences between pixels separated away from each other by one field period or two field periods (one frame period) with a threshold value. The sum of the absolute values of differences between pixels separated away from each other by one field period is referred to as an inter-field difference. The sum of the absolute values of differences between pixels separated away from each other by two field periods (one frame period) is referred to as an inter-frame difference.

It is to be noted that FIG. 3 is a diagram roughly showing movement detection processing carried out in the image-quality priority mode in which the image data Vp of the progressive system is obtained by carrying out interpolation processing on the image data V-1 of the field leading ahead of the current field by one field period. It is also possible to carry out movement detection processing in the speed priority mode in which the image data Vp of the progressive system is obtained by carrying out interpolation processing on the image data V0 of the current field. However, the movement detection processing carried out in the speed priority mode is not shown in the figure.

Figure 4:
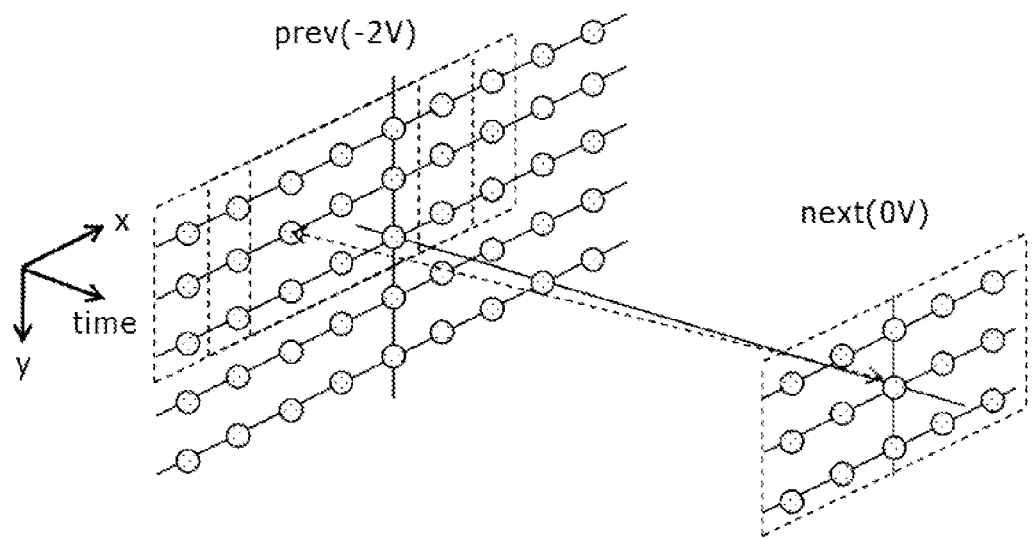
FIG. 4 is an explanatory diagram to be referred to in description of motion-vector detection processing carried out by a motion-vector detection part employed in the IP conversion section.

The motion-vector detection part 122 carries out motion-vector detection processing on the basis of the image data V0 of the current field, the image data V-1 of the field leading ahead of the current field by one field period and the image data V-2 of the field leading ahead of the current field by two field periods. As shown in FIG. 4, the motion-vector detection part 122 detects a motion vector for every pixel or for every pixel block by carrying out typically a block matching process on pieces of pixel data separated away from each other by one frame period. In this case, a vector oriented in a direction resulting in a smallest sum of the absolute values of differences is taken as a motion vector.

The film detection part 123 carries out film detection processing on the basis of the image data V0 of the current field, the image data V-1 of the field leading ahead of the current field by one field period and the image data V-2 of the field leading ahead of the current field by two field periods. To be more specific, the film detection part 123 determines whether or not the image data V0 is a film (2-2 pull-down or 2-3 pull-down) material and obtains a result of the determination. The film detection part 123 determines whether or not the image data V0 is data of a film material by making use of an inter-field difference absolute-value sum and an inter-frame difference absolute-value sum which have been found for pixels of the entire film detection area. At that time, the film detection part 123 also determines which ones of the image data V0 of the current field, the image data V-1 of the field leading ahead of the current field by one field period and the image data V-2 of the field leading ahead of the current field by two field periods form a pair.

FIG. 5A is a diagram showing image data of the 2-3 pull-down which is one of the film materials cited above. This image data is obtained as a result of carrying out conversion processing (pull-down) to convert a film original image having 24 film frames per second into image data having fields per second. In this conversion processing, each odd-numbered film frame is converted into two fields whereas each even-numbered film frame is converted into three fields. As an alternative, each odd-numbered film frame is converted into three fields whereas each even-numbered film frame is converted into two fields.

FIG. 5B is a diagram showing pieces of image data for a combination of three fields. That is to say, the figure shows image data Ao of the field leading ahead of the current field by two field periods, image data Ae of the field leading ahead of the current field by one field period and image data Bo of the current field. In the case of this combination of the three fields, the image data Ao and the image data Ae form a pair. FIG. 5C is a diagram showing pieces of image data for another combination of three fields. That is to say, this figure shows the image data Ae of the field leading ahead of the current field by two field periods, the image data Bo of the field leading ahead of the current field by one field period, and image data Be of the current field. In the case of this combination of the three fields, the image data Bo and the image data Be form a pair.

In the case of the image-quality priority mode, the pixel/coefficient select part 124 determines each pixel (interpolation pixel) and coefficient (interpolation coefficient) which are to be used in interpolating the image of the field leading ahead of the current field by one field period. In this case, the pixel/coefficient select part 124 determines each pixel and coefficient by adaptively switching processing among MA (Movement Adaptive) interpolation processing based on a movement detection result, MC (Movement Compensation) interpolation processing based on a motion-vector detection result and inverted pull-down conversion processing based on a film detection result.

In the case of the speed priority mode, the pixel/coefficient select part 124 determines each pixel (interpolation pixel) and coefficient (interpolation coefficient) which are to be used in interpolating the image of the current field. In this case, the pixel/coefficient select part 124 determines each pixel and coefficient by adaptively switching processing from MA interpolation processing based on a movement detection result to MC interpolation processing based on a motion-vector detection result and vice versa.

FIG. 6 is a diagram showing typical interpolation pixel selection candidates of intra-field interpolation and inter-field interpolation for an interpolated pixel position on an image of a field (−1V) leading ahead of the current field by one field period in the image-quality priority mode. FIG. 7 is a diagram showing typical interpolation pixel selection candidates of intra-field interpolation and inter-field interpolation for an interpolated pixel position on an image of the current field (0V) in the speed priority mode. Eventually, the pixel/coefficient select part 124 selects pixels each having a coefficient (interpolation coefficient) assigned thereto as interpolation pixels from the interpolation pixel selection candidates and supplies the selected interpolation pixels and their respective coefficients assigned thereto to the interpolation part 125.

On the basis of each pixel and its coefficient which have been determined by the pixel/coefficient select part 124, the interpolation part 125 carries out interpolation processing in order to obtain the image data Vp of the progressive system. In this case, the interpolation part 125 carries out convolution processing on the pixel data (pixel values) and the coefficients in order to find an interpolated pixel value. In the case of the image-quality priority mode, the interpolation part 125 carries out interpolation processing on the image data of the field leading ahead of the current field by one field period in order to obtain the image data Vp. That is to say, the image data Vp obtained in the image-quality priority mode is image data delayed by 1V. In the case of the speed priority mode, on the other hand, the interpolation part 125 carries out interpolation processing on the image data of the current field in order to obtain the image data Vp. That is to say, the image data Vp obtained in the speed priority mode is image data with no delay time.

Operations carried out by the IP conversion section 116 shown in FIG. 2 are explained briefly as follows. The image data V0 of the current field, the image data V-1 of the field leading ahead of the current field by one field period and the image data V-2 of the field leading ahead of the current field by two field periods are supplied to the movement detection part 121, the motion-vector detection part 122, the film detection part 123 and the pixel/coefficient select part 124.

On the basis of the image data V0 of the current field, the image data V-1 of the field leading ahead of the current field by one field period and the image data V-2 of the field leading ahead of the current field by two field periods, the movement detection part 121 carries out movement detection processing and supplies a movement detection result representing the distance of a movement to the pixel/coefficient select part 124. In addition, on the basis of the image data of each field, the motion-vector detection part 122 carries out motion-vector detection processing and supplies a motion-vector detection result including a vector and reliability to the pixel/coefficient select part 124. On top of that, on the basis of the image data of each field, the film detection part 123 carries out film detection processing and supplies a film detection result including pair information explained above to the pixel/coefficient select part 124.

In the case of the image-quality priority mode, the pixel/coefficient select part 124 determines each pixel (interpolation pixel) and its coefficient (its interpolation coefficient) which are to be used in interpolating the image of the field leading ahead of the current field by one field period. In this case, the pixel/coefficient select part 124 determines each pixel and its coefficient by adaptively switching processing among MA interpolation processing based on a movement detection result, MC interpolation processing based on a motion-vector detection result and inverted pull-down conversion processing based on a film detection result.

In the case of the speed priority mode, the pixel/coefficient select part 124 determines each pixel (interpolation pixel) and its coefficient (its interpolation coefficient) which are to be used in interpolating the image of the current field. In this case, the pixel/coefficient select part 124 determines each pixel and its coefficient by adaptively switching processing from MA interpolation processing based on a movement detection result to MC interpolation processing based on a motion-vector detection result and vice versa.

The pixel/coefficient select part 124 supplies each pixel and its coefficient, which have been determined by the pixel/coefficient select part 124, to the interpolation part 125. On the basis of each pixel and its coefficient thus received, the interpolation part 125 carries out interpolation processing in order to obtain the image data Vp of the progressive system. In this case, the interpolation part 125 carries out convolution processing on the pixel data (pixel values) and the coefficients in order to find the interpolated pixel value.

In the case of the image-quality priority mode, by making use of the image data V0 of the current field, the image data V-1 of the field leading ahead of the current field by one field period and the image data V-2 of the field leading ahead of the current field by two field periods, the interpolation processing is carried out on the image data V-1 of the field leading ahead of the current field by one field period in order to obtain the image data Vp on the basis of each pixel and its coefficient which have been determined by the pixel/coefficient select part 124. In the case of the speed priority mode, on the other hand, by making use of the image data V0 of the current field and the image data V-1 of the field leading ahead of the current field by one field period, the interpolation processing is carried out on the image data V0 of the current field in order to obtain the image data Vp on the basis of each pixel and its coefficient which have been determined by the pixel/coefficient select part 124.

[Coefficient Determination Processing of Pixel/Coefficient Select Part]

Figure 8:
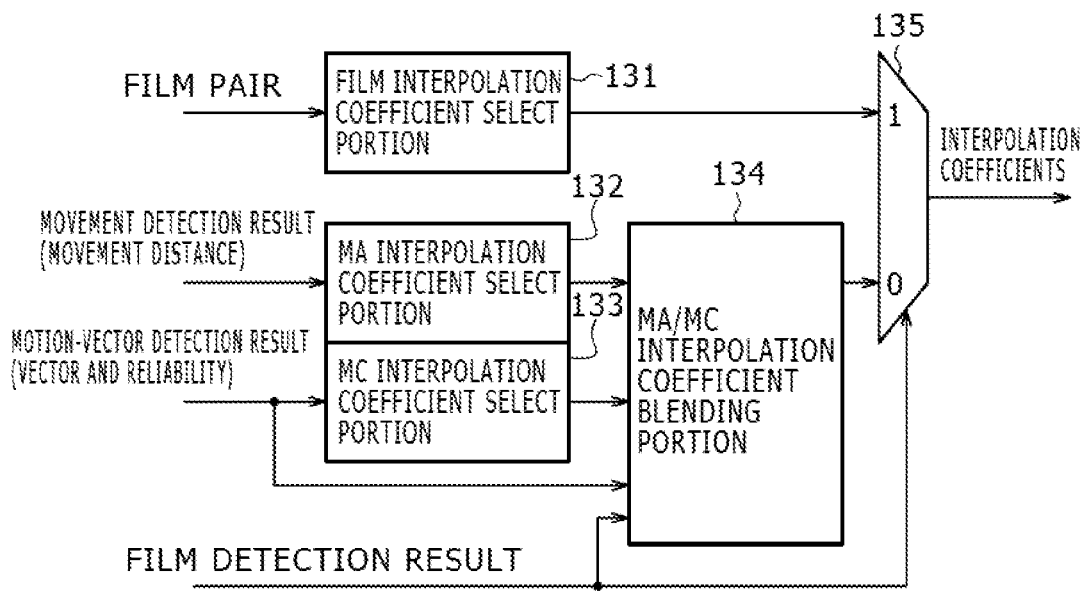
FIG. 8 is a diagram showing a typical configuration of a coefficient determination processing unit included in a pixel/coefficient select part of the IP conversion section for the image-quality priority mode (or a normal mode)

Coefficient determination processing carried out by the pixel/coefficient select part 124 is further explained as follows. FIG. 8 is a diagram showing a typical configuration of a coefficient determination processing unit included in the pixel/coefficient select part 124 in the case of the image-quality priority mode (normal mode). As shown in the figure, the coefficient determination processing unit includes a film interpolation coefficient select portion 131, an MA interpolation coefficient select portion 132, an MC interpolation coefficient select portion 133, an MA/MC interpolation coefficient blending portion 134 and a selector 135. In the case of the image-quality priority mode, in accordance with a film detection result, either a film interpolation coefficient or an MA/MC interpolation blended coefficient is selected in order to determine a coefficient (interpolation coefficient). In this case, if the film detection result is true, the film interpolation coefficient is selected. If the film detection result is false, on the other hand, the MA/MC interpolation blended coefficient is selected.

Figure 9:
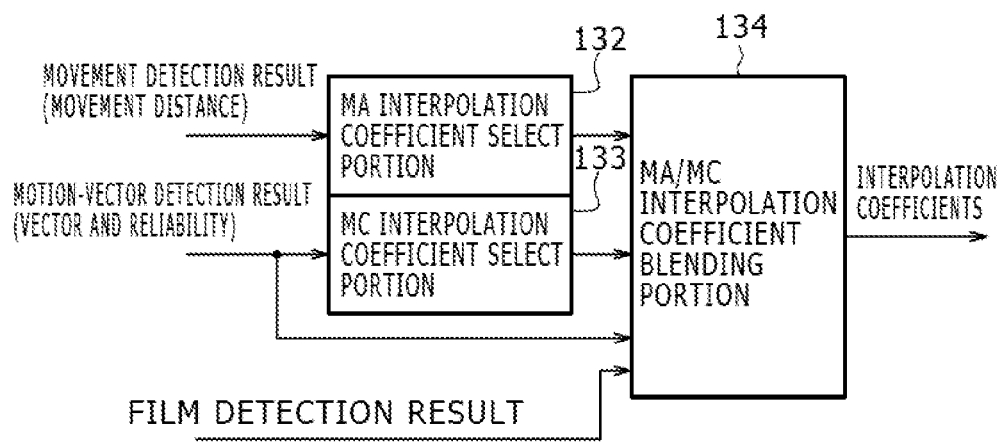
FIG. 9 is a diagram showing a typical configuration of a coefficient determination processing unit included in the pixel/coefficient select part of the IP conversion section for the speed priority mode (or a game mode)

FIG. 9 is a diagram showing a typical configuration of a coefficient determination processing unit included in the pixel/coefficient select part 124 in the case of the speed priority mode (game mode). As shown in the figure, the coefficient determination processing unit includes the MA interpolation coefficient select portion 132, the MC interpolation coefficient select portion 133 and the MA/MC interpolation coefficient blending portion 134. When Prev (−2V) and Curr (−1V) form a pair as shown in FIG. 5B, implementation is impossible unless the output is delayed by 1V. Thus, in the case of the speed priority mode, the film interpolation coefficient is not selected. That is to say, the MA/MC interpolation blended coefficient is always output.

Figure 10A:
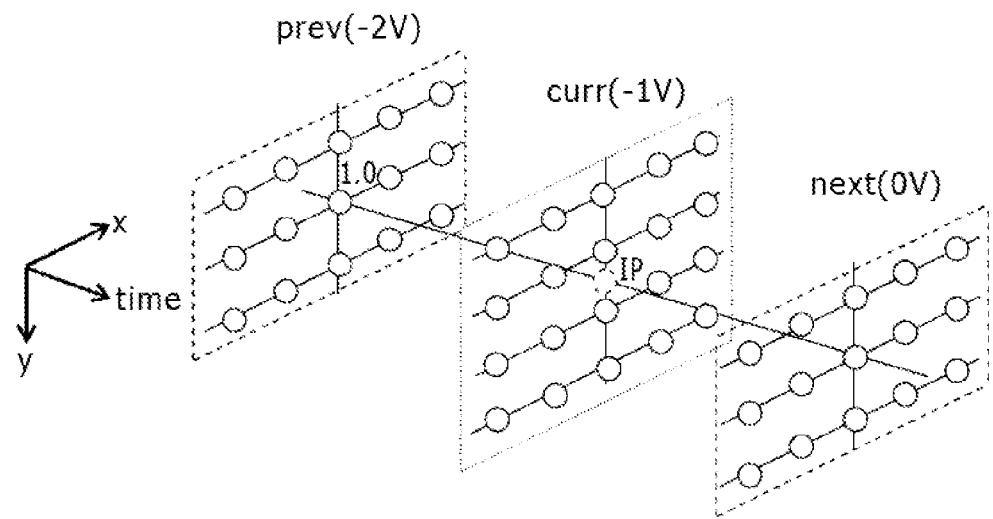
FIGS. 10A and 10B are explanatory diagrams to be referred to in description of an interpolation-coefficient determination method adopted by a film interpolation coefficient select portion employed in the coefficient determination processing unit.
Figure 10B:
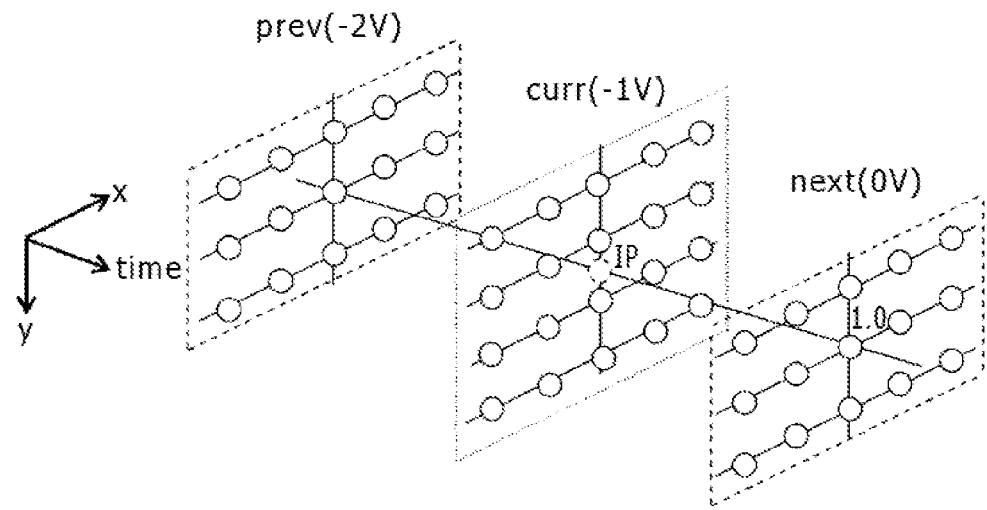

Next, the configuration portions shown in FIGS. 8 and 9 are explained as follows. The film interpolation coefficient select portion 131 determines an interpolation coefficient in accordance with pair information. If Prev (−2V) and Curr (−1V) form a pair as shown in FIG. 5B, the coefficient of a pixel at a location having the same horizontal and vertical coordinates on Prev (−2V) as those of an interpolated pixel IP is set at 1.0 (100%) as shown in FIG. 10A. If Next (0V) and Curr (−1V) form a pair as shown in FIG. 5C, on the other hand, the coefficient of a pixel at a location having the same horizontal and vertical coordinates on Next (0V) as those of the interpolated pixel IP is set at 1.0 (100%) as shown in FIG. 10B.

Figure 11A:
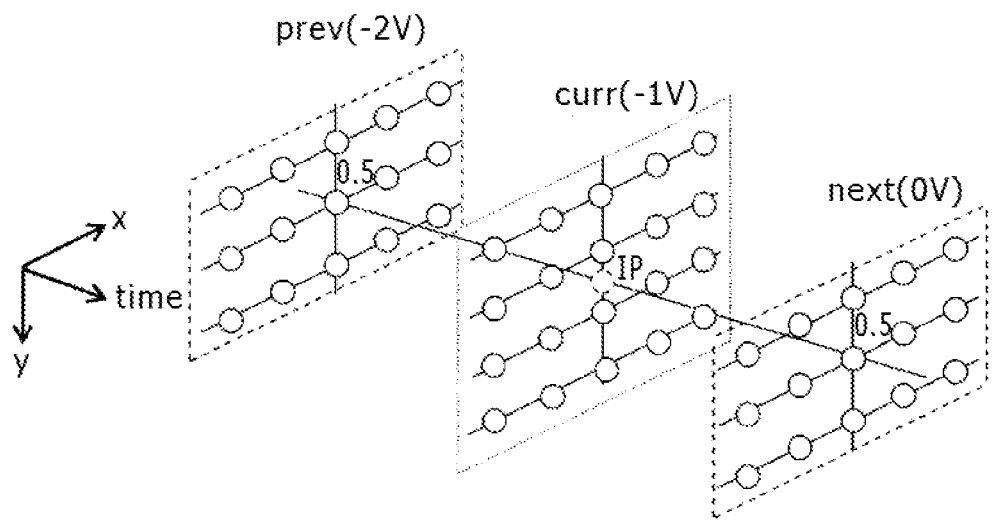
FIGS. 11A and 11B are explanatory diagrams to be referred to in description of an MA interpolation coefficient select method adopted in the image-quality priority mode.
Figure 11B:
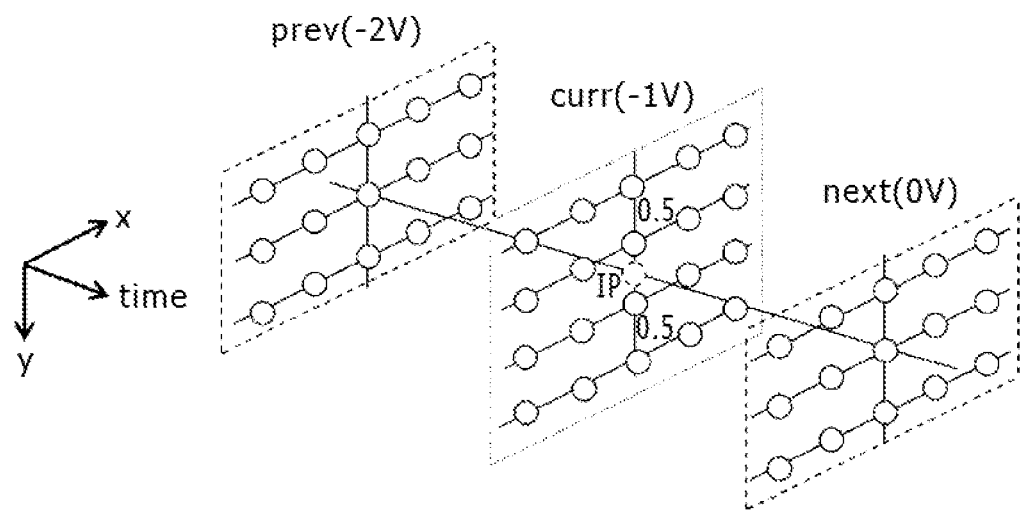

The MA interpolation coefficient select portion 132 determines an interpolation coefficient in accordance with a movement detection result. In the following description, for the sake of simplicity, first of all, an inclined-line detection result is assumed to be a vertical-direction (vertical-line) result. FIGS. 11A and 11B are explanatory diagrams referred to in the following description of an MA interpolation coefficient select method adopted in the image-quality priority mode. If the movement detection result indicates a standstill, the coefficients of the two pixels each existing at a location having the same horizontal and vertical coordinates on Prev (−2V) and Next (0V) respectively as those of the interpolated pixel IP are each set at 0.5 (50%) as shown in FIG. 11A. If the movement detection result indicates a movement, on the other hand, the coefficients of two pixels at locations respectively above and below the interpolated pixel IP on Curr (−1V) are each set at 0.5 (50%) as shown in FIG. 11B.

In actuality, the movement detection result is not a binary value indicating either a standstill or a movement. The movement detection result normally has values at a plurality of stages delimited from each other by a plurality of threshold values for determining one of the movement detection stages including a stage corresponding to the standstill. In this case, the MA interpolation coefficient select portion 132 finds an MA coefficient by blending coefficients of a standstill and a movement with each other in accordance with the movement detection stages and outputs the blended MA coefficient.

Figure 12A:
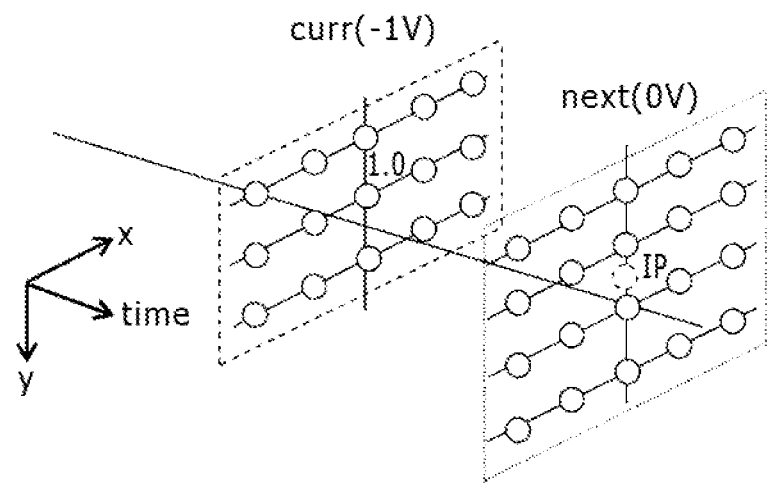
FIGS. 12A and 12B are explanatory diagrams to be referred to in description of an MA interpolation coefficient select method adopted in the speed priority mode.
Figure 12B:
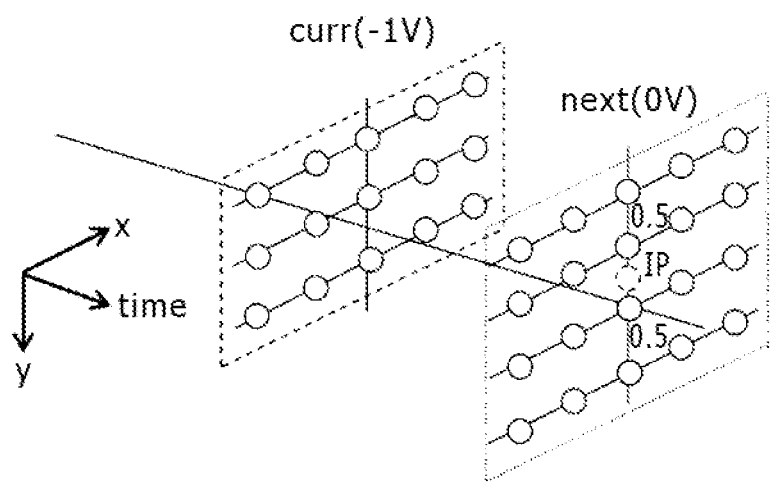

FIGS. 12A and 12B are explanatory diagrams to be referred to in description of an MA interpolation coefficient select method adopted in the speed priority mode. If the movement detection result indicates a standstill, a pixel having the same horizontal and vertical coordinates as those of the interpolated pixel IP exists only on Curr (−1V). Thus, the coefficient of such a pixel is set at 1.0 (100%) as shown in FIG. 12A. If the movement detection result indicates a movement, on the other hand, the coefficients of two pixels at locations respectively above and below the interpolated pixel IP on Next (0V) are each set at 0.5 (50%) as shown in FIG. 12B. In the same way as the image-quality priority mode described above, the coefficients of the standstill and the movement are blended with each other in accordance with the movement detection stages and outputted.

Figure 13:
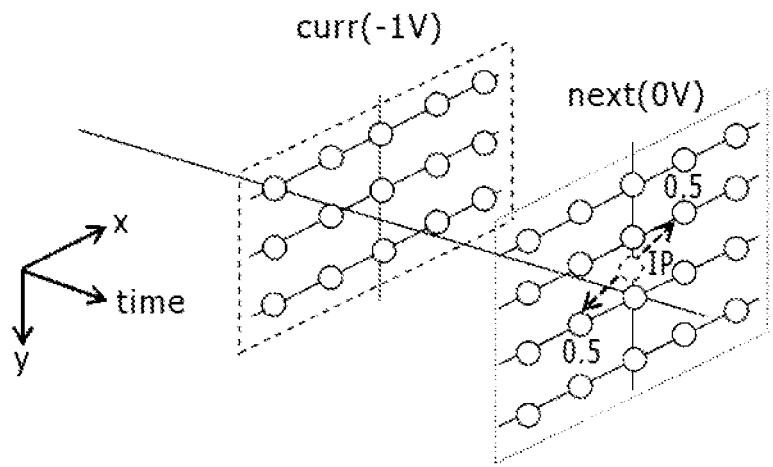
FIG. 13 is a diagram showing a state in which a selected pixel has been moved at a movement time in accordance with a result of detecting the direction of an inclined line in the speed priority mode.

It is to be noted that, in the case of the MA interpolation, the selected pixel is actually moved in the right and left direction in accordance with a result of detecting the direction of an inclined line. FIG. 13 is a diagram showing a state in which a selected pixel at a movement time has been moved in the speed priority mode. It is to be noted that detailed explanation of the detection of the direction of an inclined line is omitted. As generally known in the past, however, the direction of an inclined line is detected by making use of data of pixels surrounding the interpolated pixel IP.

Figure 14:
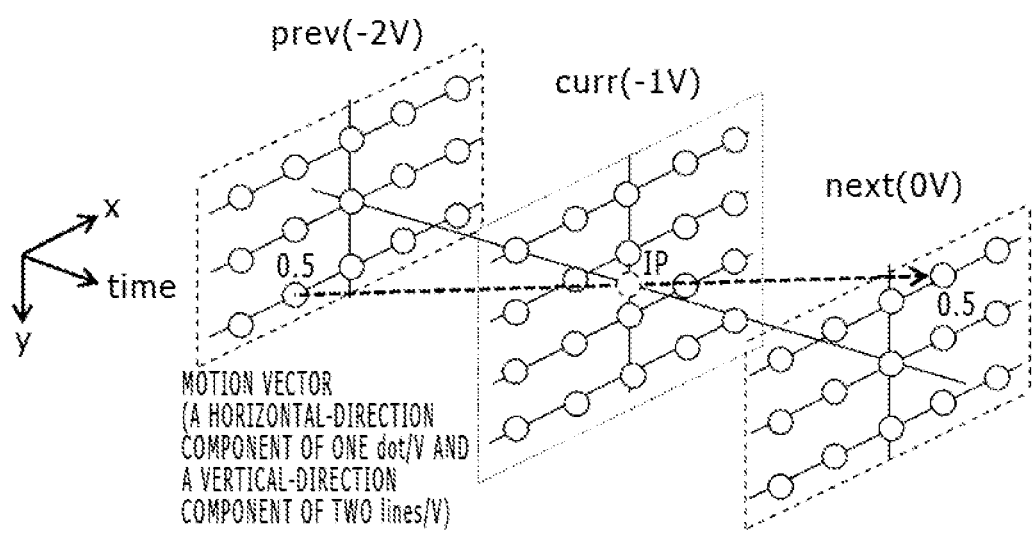
FIG. 14 is an explanatory diagram to be referred to in description of an MC interpolation coefficient select method adopted in the image-quality priority mode.

The MC interpolation coefficient select portion 133 determines an interpolation coefficient in accordance with a motion-vector detection result. FIG. 14 is an explanatory diagram referred to in the following description of an MC interpolation coefficient select method adopted in the image-quality priority mode. FIG. 14 shows a typical case in which the motion vector is a vector having a horizontal-direction component of one dot/V (field) and a vertical-direction component of two lines/V (field). Prev (−2V) and Next (0V) sandwich the interpolated pixel IP. The coefficients of two pixels existing on Prev (−2V) and Next (0V) as pixels for the pointing direction of the motion vector are each set at 0.5 (50%). If pixels for the pointing direction of the motion vector do not exist, that is, in the case of a movement of an odd number of lines/V (field), the MA interpolation processing is selected.

Figure 15:
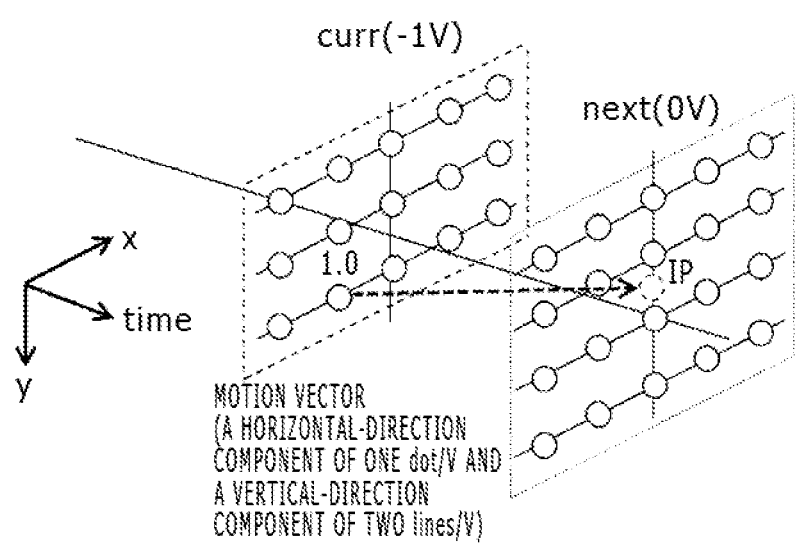
FIG. 15 is an explanatory diagram to be referred to in description of an MC interpolation coefficient select method adopted in the speed priority mode.

FIG. 15 is an explanatory diagram referred to in the following description of an MC interpolation coefficient select method adopted in the speed priority mode. FIG. 15 also shows a typical case in which the motion vector is a vector having a horizontal-direction component of one dot/V (field) and a vertical-direction component of two lines/V (field). For the interpolated pixel IP, the coefficient of a pixel existing on Curr (−1V) as a pixel for the pointing direction of the motion vector is set at 1.0 (100%). In the same way as the image-quality priority mode, if a pixel for the pointing direction of the motion vector does not exist, the MA interpolation processing is selected.

The MA/MC interpolation coefficient blending portion 134 blends the MA interpolation coefficient with the MC interpolation coefficient in order to output an MA/MC interpolation blended coefficient. The MA/MC interpolation coefficient blending portion 134 determines a blending rate of the MA/MC interpolation coefficient in accordance with the motion vector and the reliability of the motion vector. The reliability of the motion vector is determined typically in accordance with the minimum value of sums used in finding a motion vector as the sums of the absolute values of block differences. The smaller the minimum value of the sums of the absolute values of block differences is, the higher the degree of matching is established and, thus, the higher the reliability is.

The higher the reliability of the motion vector is, the higher the blending rate of the MC interpolation coefficient is made by the MA/MC interpolation coefficient blending portion 134. As an exception, however, if a result of the detection indicates a film material, half a movement between frames (2V) does not match a movement between fields (1V), resulting in judders. Thus, in this case, the MA interpolation processing is selected. In addition, as described above, also in the case of a movement of an odd number of lines/V (field), pixels to be used in the MC interpolation processing do not exist on adjacent fields. Thus, also in this case, the MA interpolation processing is selected.

The selector 135 selects the film interpolation coefficient or the MA/MC interpolation blended coefficient in accordance with the film detection result and outputs the selected coefficient. In this case, as described above, if the film detection result is true, the film interpolation coefficient is selected. If the film detection result is false, on the other hand, the MA/MC interpolation blended coefficient is selected.

As described above, the IP conversion section 116 employed in the TV receiver 10 shown in FIG. 1 is capable of carrying out image processing in the image-quality priority mode or in the speed priority mode. In addition, in the image-quality priority mode, each pixel and its coefficient, which are to be used in interpolating the image of the field leading ahead of the current field by one field period, are determined by adaptively switching processing among the movement adaptive interpolation processing, the movement compensation interpolation processing and the inverted pull-down conversion processing. Thus, in the image-quality priority mode, it is possible to carry out IP conversion processing resulting in an image with a high quality.

In the speed priority mode, interpolation processing is carried out on image data of the current field in order to obtain image data of the progressive system. In addition, each pixel and its coefficient, which are to be used in interpolating the image of the current field, are determined by adaptively switching processing from movement adaptive interpolation processing to movement compensation interpolation processing and vice versa. That is to say, three-dimensional IP conversion processing is carried out. Thus, in the speed priority mode, it is possible to carry out IP conversion processing resulting in an image with a high quality and entailing only a short delay time.

In addition, in the MA interpolation processing carried out in the speed priority mode for example, the IP conversion section 116 employed in the TV receiver 10 shown in FIG. 1 detects the direction of an inclined line by making use of data of pixels surrounding the interpolated pixel and determines a pixel according to the direction of the inclined line as well as a coefficient for the pixel (refer to FIG. 13). That is to say, inclined-line adaptive interpolation processing is carried out. By carrying out the inclined-line adaptive interpolation processing in this way, jaggies can be prevented from being generated on an inclined line in the speed priority mode so that the quality of an image based on the image data Vp of the progressive system can be further improved in the speed priority mode.

2. Modification Examples

The embodiment described above implements a typical example of the TV receiver 10 employing the IP conversion section 116. It is to be noted, however, that the IP conversion section according to the embodiment of the present disclosure can of course be applied to other image display apparatus each requiring IP conversion processing. Typical examples of the other image display apparatus are a monitor apparatus and a projector.

In addition, in the embodiment described above, the processing of the IP conversion section 116 can be carried out by hardware or by software. If the processing of the IP conversion section 116 is to be carried out by execution of software, a program prescribing the sequence of the processing is installed in a memory employed in a computer included in dedicated hardware to be executed later. As an alternative, such a program can also be installed for later execution in a general-purpose computer capable of carrying out various kinds of processing. In this case, the computer executes the program in order to carry out functions of a variety of functional blocks employed in the IP conversion section 116.

In addition, the present disclosure can also be realized as the following implementations:

(1) An image processing apparatus including:
an interlace/progressive conversion section configured to carry out interpolation processing on image data of the current field by making use of the image data of the current field and image data of a field leading ahead of the current field by one field period in order to obtain image data of a progressive system with no delay time.

(2) The image processing apparatus according to the implementation (1), in which the interlace/progressive conversion section determines each pixel and its coefficient to be used in interpolating the image of the current field by adaptively switching processing from movement adaptive interpolation processing based on a movement detection result to movement compensation interpolation processing based on a motion-vector detection result and vice versa.

(3) The image processing apparatus according to the implementation (2), in which the interlace/progressive conversion section detects a direction of an inclined line in the movement adaptive interpolation processing by making use of data of pixels surrounding an interpolated pixel and determines pixels according to the direction of the inclined line as well as a coefficient for each of the pixels.

(4) The image processing apparatus according to any one of the implementations (1) to (3), in which the interlace/progressive conversion section includes:
a pixel/coefficient select part configured to determine each pixel and its coefficient to be used in interpolating the image of the current field by adaptively switching processing from the movement adaptive interpolation processing based on a movement detection result to the movement compensation interpolation processing based on a motion-vector detection result and vice versa; and
an interpolation part configured to obtain image data of the progressive system by carrying out interpolation processing on the image data of the current field by making use of the image data of the current field and the image data of the field leading ahead of the current field by one field period on the basis of each pixel and its coefficient that have been determined by the pixel/coefficient select part.

(5) The image processing apparatus according to the implementation (4), in which the pixel/coefficient select part detects the direction of the inclined line in the movement adaptive interpolation processing by making use of the data of the pixels surrounding the interpolated pixel and determines pixels according to the direction of the inclined line as well as a coefficient for each of the pixels.

(6) An image processing method obtaining image data of a progressive system by carrying out interpolation processing on image data of the current field through use of the image data of the current field and image data of a field leading ahead of the current field by one field period and through adaptive switching of processing from movement adaptive interpolation processing based on a movement detection result to movement compensation interpolation processing based on a motion-vector detection result and vice versa.

(7) An image processing apparatus including:
a pixel/coefficient select part configured to determine each pixel and its coefficient to be used in interpolating image of a field leading ahead of the current field by one field period by adaptively switching processing among movement adaptive interpolation processing based on a movement detection result, movement compensation interpolation processing based on a motion-vector detection result and inverted pull-down conversion processing based on a film detection result in an image-quality priority mode, and to determine each pixel and its coefficient to be used in interpolating image of the current field by adaptively switching processing from the movement adaptive interpolation processing based on a movement detection result to the movement compensation interpolation processing based on a motion-vector detection result and vice versa in a speed priority mode; and
an interpolation part configured to obtain image data of a progressive system in the image-quality priority mode by carrying out interpolation processing on the image data of the field leading ahead of the current field by one field period by making use of the image data of the current field, the image data of the field leading ahead of the current field by one field period and image data of a field leading ahead of the current field by two field periods on the basis of each pixel and its coefficient that have been determined by the pixel/coefficient select part, and to obtain image data of the progressive system in the speed priority mode by carrying out interpolation processing on the image data of the current field by making use of the image data of the current field and the image data of the field leading ahead of the current field by one field period on the basis of each pixel and its coefficient that have been determined by the pixel/coefficient select part.

(8) An image display apparatus including:
an image processing section configured to convert image data of an interlace system into image data of a progressive system;
an image display section configured to display an image on the basis of the image data of the progressive system generated by the image processing section; and
a control section configured to control the image processing section selectively in an image-quality priority mode or a speed priority mode,
in which the image processing section has a pixel/coefficient select part configured to determine each pixel and its coefficient to be used in interpolating image of a field leading ahead of the current field by one field period by adaptively switching processing among movement adaptive interpolation processing based on a movement detection result, movement compensation interpolation processing based on a motion-vector detection result and inverted pull-down conversion processing based on a film detection result in the image-quality priority mode, and to determine each pixel and its coefficient to be used in interpolating image of the current field by adaptively switching processing from the movement adaptive interpolation processing based on a movement detection result to the movement compensation interpolation processing based on a motion-vector detection result and vice versa in the speed priority mode, and an interpolation part configured to obtain image data of the progressive system in the image-quality priority mode by carrying out interpolation processing on the image data of the field leading ahead of the current field by one field period by making use of the image data of the current field, the image data of the field leading ahead of the current field by one field period and image data of a field leading ahead of the current field by two field periods on the basis of each pixel and its coefficient that have been determined by the pixel/coefficient select part, and to obtain image data of the progressive system in the speed priority mode by carrying out interpolation processing on the image data of the current field by making use of the image data of the current field and the image data of the field leading ahead of the current field by one field period on the basis of each pixel and its coefficient that have been determined by the pixel/coefficient select part.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
an interlace/progressive conversion section configured to carry out three-dimensional interpolation processing on image data of a current field by making use of the image data of the current field and image data of a field leading ahead of the current field by one field period such that the image data of only the current field and the field leading ahead of the current field by one field period are used in order to obtain image data of a progressive system with no delay time,
in which the interlace/progressive conversion section is further configured to determine a respective coefficient for each pixel to be used in interpolating the image of the current field by blending a movement adaptive (MA) coefficient obtained based on a movement detection result and a movement compensation (MC) coefficient based on a motion-vector detection result.

2. The image processing apparatus according to claim 1, wherein the interlace/progressive conversion section detects a direction of an inclined line in the movement adaptive interpolation processing by making use of data of pixels surrounding an interpolated pixel and determines pixels according to the direction of the inclined line as well as a coefficient for each of the pixels.

3. An image processing method obtaining image data of a progressive system by carrying out three-dimensional interpolation processing on image data of a current field through use of the image data of the current field and image data of a field leading ahead of the current field by one field period such that the image data of only the current field and the field leading ahead of the current field by one field period are used and by determining a respective coefficient for each pixel to be used in interpolating the image of the current field by blending a movement adaptive (MA) coefficient obtained based on a movement detection result and a movement compensation (MC) coefficient based on a motion-vector detection result.

4. An image processing apparatus comprising:
a pixel/coefficient select part configured to determine each pixel and its coefficient to be used in interpolating image of a field leading ahead of the current field by one field period by adaptively switching processing among movement adaptive interpolation processing based on a movement detection result, movement compensation interpolation processing based on a motion-vector detection result and inverted pull-down conversion processing based on a film detection result in an image-quality priority mode, and to determine a respective coefficient for each pixel to be used in interpolating the image of the current field by blending a movement adaptive (MA) coefficient obtained based on a movement detection result and a movement compensation (MC) coefficient based on a motion-vector detection result in a speed priority mode; and an interpolation part configured to obtain image data of a progressive system in the image-quality priority mode by carrying out interpolation processing on the image data of the field leading ahead of the current field by one field period by making use of the image data of the current field, the image data of the field leading ahead of the current field by one field period and image data of a field leading ahead of the current field by two field periods on the basis of each pixel and its coefficient that have been determined by the pixel/coefficient select part, and to obtain image data of the progressive system in the speed priority mode by carrying out three-dimensional interpolation processing on the image data of the current field by making use of the image data of the current field and the image data of the field leading ahead of the current field by one field period such that the image data of only the current field and the field leading ahead of the current field by one field period are used on the basis of each pixel and its coefficient that have been determined by the pixel/coefficient select part.

5. An image display apparatus comprising:
an image processing section configured to convert image data of an interlace system into image data of a progressive system;
an image display section configured to display an image on the basis of the image data of the progressive system generated by the image processing section; and
a control section configured to control the image processing section selectively in an image-quality priority mode or a speed priority mode,
wherein the image processing section includes
a pixel/coefficient select part configured to determine each pixel and its coefficient to be used in interpolating image of a field leading ahead of the current field by one field period by adaptively switching processing among movement adaptive interpolation processing based on a movement detection result, movement compensation interpolation processing based on a motion-vector detection result and inverted pull-down conversion processing based on a film detection result in the image-quality priority mode, and to determine a respective coefficient for each pixel to be used in interpolating the image of the current field by blending a movement adaptive (MA) coefficient obtained based on a movement detection result and a movement compensation (MC) coefficient based on a motion-vector detection result in the speed priority mode, and an interpolation part configured to obtain image data of the progressive system in the image-quality priority mode by carrying out interpolation processing on the image data of the field leading ahead of the current field by one field period by making use of the image data of the current field, the image data of the field leading ahead of the current field by one field period and image data of a field leading ahead of the current field by two field periods on the basis of each pixel and its coefficient that have been determined by the pixel/coefficient select part, and to obtain image data of the progressive system in the speed priority mode by carrying out three-dimensional interpolation processing on the image data of the current field by making use of the image data of the current field and the image data of the field leading ahead of the current field by one field period such that the image data of only the current field and the field leading ahead of the current field by one field period are used on the basis of each pixel and its coefficient that have been determined by the pixel/coefficient select part.

6. The image processing apparatus according to claim 1, in which the interlace/progressive conversion section is configured to determine a blending rate at which to blend the MA coefficient and the MC coefficient.

7. The image processing apparatus according to claim 6, in which the interlace/progressive conversion section is configured to determine the blending rate in accordance with a motion vector and a reliability of the motion vector.

8. The image processing apparatus according to claim 7, in which a portion of the blending rate pertaining to the MC coefficient increases as the reliability of the motion vector increases.

* * * * *